United States Patent

[11] 3,582,883

[72] Inventors David H. Shepard
Rye, N.Y.;
Howard W. Silsby, III, Annandale, Va.
[21] Appl. No. 594,962
[22] Filed Oct. 13, 1966
[45] Patented June 1, 1971
[73] Assignee Farrington Electronics, Inc.
Springfield, Va.
by said Silsby

[54] READING APPARATUS

24 Claims, 21 Drawing Figs.

[52] U.S. Cl. 340/146.3
[51] Int. Cl. G06k 9/00
[50] Field of Search 340/146.3

[56] References Cited

UNITED STATES PATENTS

| | | | |
|---|---|---|---|
| 3,008,123 | 11/1961 | Rohland et al. | 340/146.3 |
| 2,956,264 | 10/1960 | Rohland et al. | 340/146.3 |
| 2,919,426 | 12/1959 | Rohland | 340/146.3 |
| 2,738,499 | 3/1956 | Sprick | 340/146.3 |

*Primary Examiner*—Maynard R. Wilbur
*Assistant Examiner*—Jeremiah Glassman
*Attorney*—Mason, Fenwick & Lawrence

ABSTRACT: Character recognition apparatus wherein portions of the character to be identified are projected to form composite transformed scanning signals. In particular, a logical operation is continuously performed over all scanning lines prior to and including the current scanning line, the logical operation being performed on the entire set of signal elements of the current scanning line and a second set of scanning signals which represent the logical sum of all scanning lines prior to the current scanning line. The projected portions of the character thus constitute certain identifying features, which when combined with other identifying features such as the presence of a character stroke (corresponding to the current scanning line) enable processing circuitry responsive to the transformed scanning signal in the current scanning signal to effect character recognition. Circuitry is also provided for changing the logical operation performed upon the current scan line signal and the second set of signals upon detection of predetermined conditions within the character. In the first mode of operation, the second set of signals is decreased in pulse width to eliminate smudges and the like. During the second mode of operation, the pulse width of the elements of the second set of signals is increased to minimize the effect of breaks in the character strokes.

Inventors
DAVID H. SHEPARD
HOWARD W. SILSBY, III
By
Mason, Fenwick & Lawrence
Attorneys Inventors
DAVID H. SHEPARD &
HOWARD W. SILSBY, III
By
Mason, Fenwick & Lawrence
Attorneys Inventors
DAVID H. SHEPARD &
HOWARD W. SILSBY, III
By Mason, Fenwick & Lawrence
Attorneys Inventors
DAVID H. SHEPARD &
HOWARD W. SILSBY, III
By
Mason, Fenwick & Lawrence
Attorneys

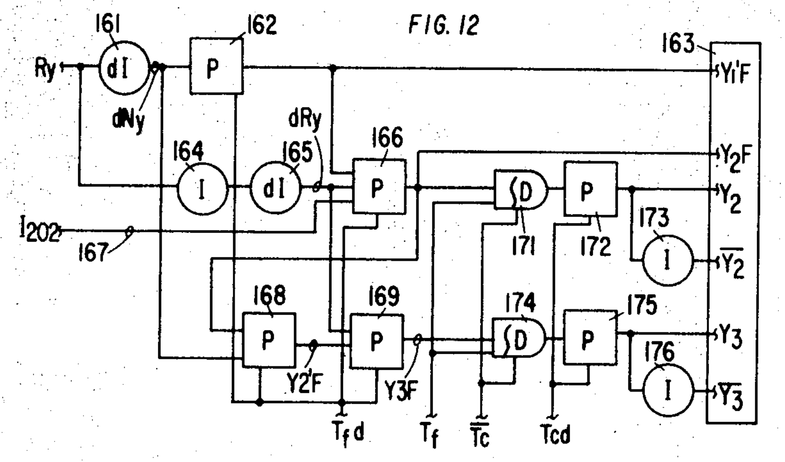
FIG. 12
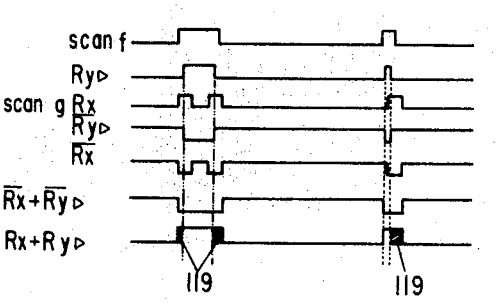
FIG. 7
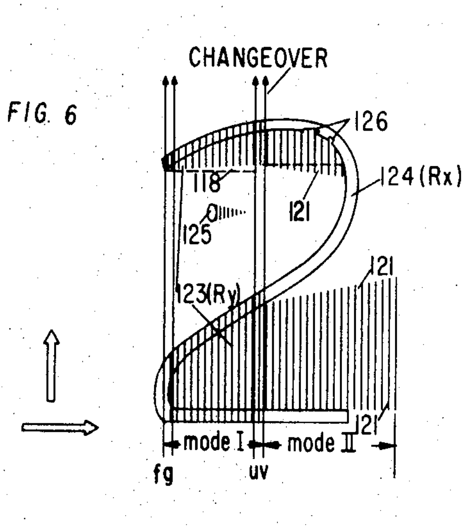
FIG. 6
FIG. 16
| | 0 | I | 1 | 2 | 3 | 4 | 5 | 6 | 7 | 8 | 9 |
|---|---|---|---|---|---|---|---|---|---|---|---|
| P209 | | | − | | | | | | + | | |
| P188 | | | − | − | | | + | | − | | + |
| P212 | | − | | | | + | | | | | |
| P204 | | + | | | | | | | | | |
| P201 | | | | | | | | + | | | − |
| P218 | | | − | + | | | | | − | | |
| P221 | | | + | + | | | + | | + | | + |
| P222 | | | | | | | + | + | | | − |
| P154 | + | − | | | | − | | | | | |
| P172 | − | − | | | | | | − | | | |
| P175 | | | | | + | − | | | | | |
| I191 (P23 or P20) | + | | | | | + | | | | | |
| I225 (P201 and $\overline{P222}$) | | | | | | | | | | + | |
| I226 ($\overline{P201}$ or P222) | | | | + | | | | | | | |
Inventors
DAVID H. SHEPARD &
HOWARD W. SILSBY, III
By Mason, Fenwick & Lawrence
Attorneys Inventors
DAVID H. SHEPARD &
HOWARD W. SILSBY, III
By Mason, Fenwick & Lawrence
Attorneys FIG. 15
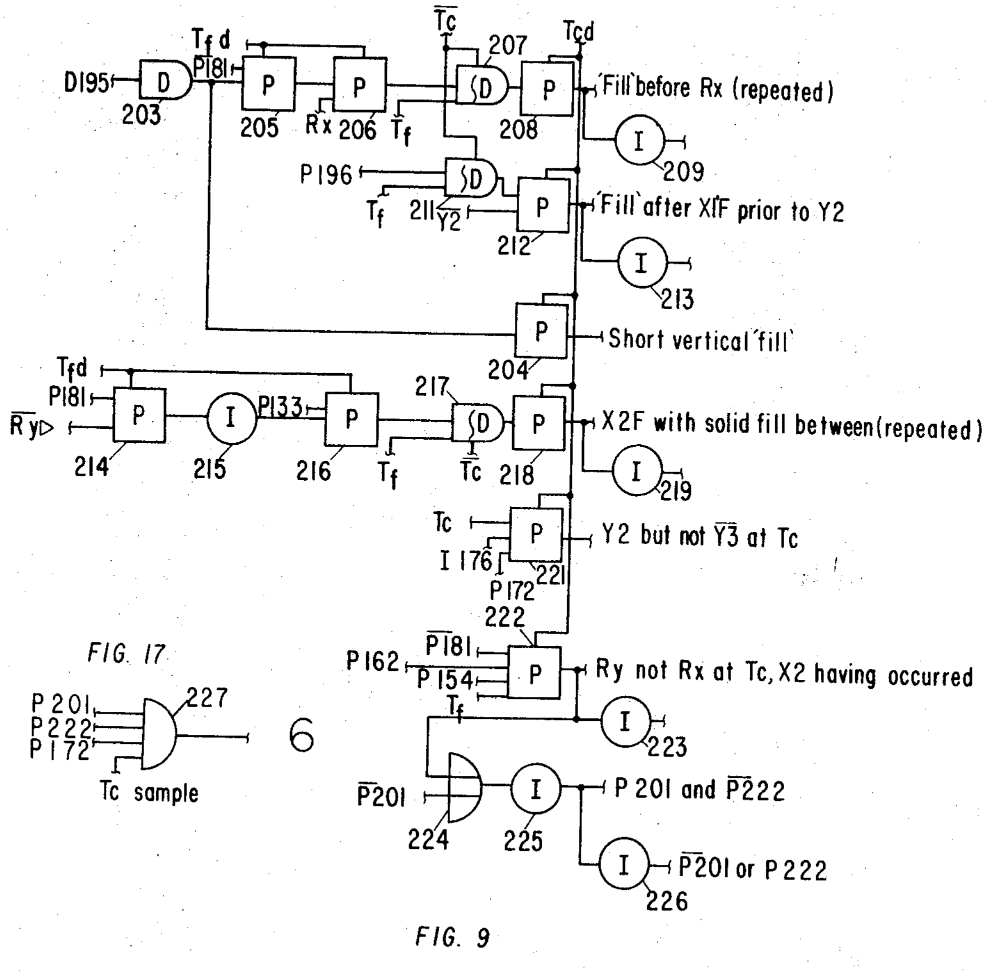
FIG. 15, FIG. 17
FIG. 9
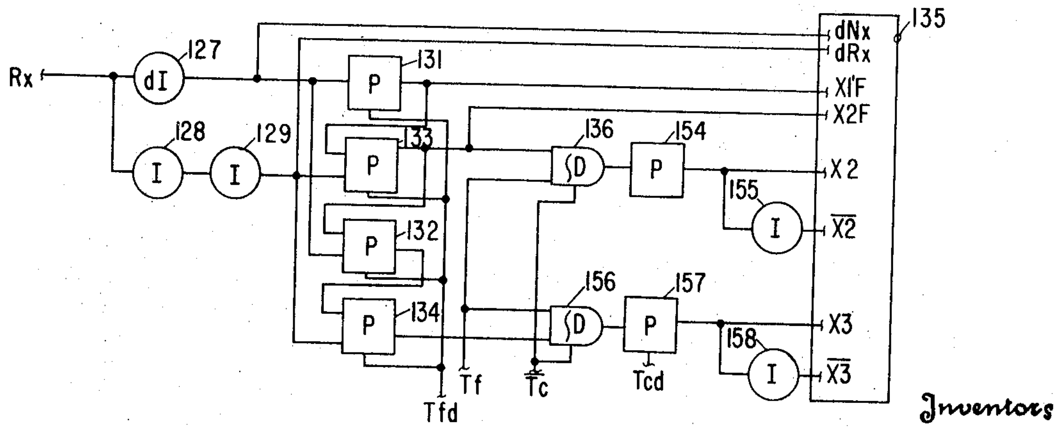
Inventors
DAVID H. SHEPARD &
HOWARD W. SILSBY, III
By
Mason, Fenwick & Lawrence
Attorneys Inventors
DAVID H. SHEPARD &
HOWARD W. SILSBY, III
By Mason, Fenwick & Lawrence
Attorneys

READING APPARATUS

The present invention relates to automatic interpretation of signals from scanning items of information such as printed characters, handwritten characters, or any type of intelligence bearing items by conversion of the items into electrical signals, and detecting by utilization of the signals and the presence and/or absence of preselected patterns to recognize the items and present the recognition decision to an output device for recording and/or reproducing the intelligence bearing item recognized.

Briefly, the uniqueness of the present invention is the transformation of the items of information into another configuration which is accomplished by utilizing on a time basis the recorded events occurring during successive scanning frame intervals, by logically adding and/or subtracting the representative signals obtained thereby. In the disclosed embodiment of the present invention this new technique has been developed in a manner to employ a storage medium, such as a magnetic drum or delay line, for producing a horizontal projection of the character by first delaying a signal occurring during a scanning frame, adding the delayed signal with signals occurring at least during one successive scanning frame, and then reintroducing the logically added information to the temporary storage medium. The projection is made of or constitutes many elements each resolvable by the scanning apparatus, and according to the present invention each element is solely representable by a single binary digit. The effect of this is, when scanning across the item from left to right, to continuously project the delayed output of the temporary storage medium to the right during each scanning frame so as to fill-in the character causing a shadowlike effect to be created.

The fill-in or shadowlike effect which transforms characters has been found to be most valuable in that, recognition of characters may be achieved independent of character size, orientation, and intracharacter proportions, while significant features of patterns will remain and/or be developed, for example, the characters 1, 2 and 3 can be recognized by counting the number of vertical crossings observed repeatedly in the delayed or shadowlike signal, which crossings will be found to be sensed as 1, 2 and 3 crossings respectively. This will be described in greater detail hereinafter, wherein it will become readily apparent that the number of vertical crossings in the delayed signal is unaffected by small loops or by a rather wide range in character slant and style as heretofore observed, thus providing a further contribution to the value of the present invention. During the course of the scanning operation, suitable logic circuitry will determine certain preselected patterns or features based on the delayed signals alone or on a combination or permutation of occurrences and/or nonoccurences of such preselected patterns (and/or their positioning within the character), each set of such selected criterion to be peculiar to only one intelligence bearing item in any group being scanned for identification purposes.

An improvement of the present invention is also shown and described herein as an integral part thereof, the improvement comprising altering the projection conditionally during the scanning so that after alteration the scanner signal is subtracted from the delayed signal, and the resultant signal is then reintroduced to the temporary storage medium. The value of this improvement is to develop additional significant features and/or patterns that may be recognized for further ascertaining character identification.

An object of the present invention is the provision of novel methods and apparatus for interpreting signals produced from scanning intelligence bearing items, and by selected predetermined characteristics identifying each of the intelligence bearing items in accordance with its representative yet distinct combinations or permutations of pattern characteristics which have been recognized from the scanned signals.

A further object of the present invention is the provision of novel reading apparatus for sensing and interpreting intelligence bearing items by producing unique patterns independent of intracharacter proportions facilitating identification of the character.

Another object of the present invention is the provision of novel reading apparatus for sensing and interpreting intelligence bearing items by producing unique patterns independent of character size and orientation facilitating identification of the character.

A further object of the present invention is to provide novel reading apparatus for distinguishing intelligence bearing items from unique patterns or portions thereof and reproducing the same, which is adapted to be selectively programmed to recognize a wide variety of intelligence bearing items.

Another object of the present invention is the provision of novel reading apparatus for sensing and interpreting intelligence bearing items by employing logical combinations of previous scanned events with current scan items events to produce a shadowlike variation of the character and, by utilization of the latter, detecting certain selected patterns for recognizing and reproducing the intelligence bearing items.

A further object of the present invention is the provision of novel reading apparatus for sensing and interpreting intelligence bearing items by employing logical combinations of previous scanned item events with current scan item events so as to fill in the character causing a shadowlike effect to cause significant patterns to appear which vary from patterns of the original character, and by utilization of the latter detecting certain selected patterns for recognizing and producing the intelligence bearing items.

Other objects, advantages and capabilities of the present invention will become apparent from the following detail description taken in conjunction with the accompanying drawings, showing only preferred embodiments of the invention.

IN THE DRAWINGS:

FIG. 6 illustrates, by way of example, the manner in which a shadow is cast upon a character by way of the logic in the shadow casting unit shown in FIG. 5.

FIGS. 7 and 8 show a series of time related voltage waveforms showing time variant voltages at the corresponding frames when scanning the character shown in FIG. 6.

FIG. 9 is a detailed schematic diagram of the R*x* crossing counter.

FIG. 12 is a detailed schematic diagram of the R*y* crossing counter unit.

FIG. 15 is a schematic diagram of the miscellaneous pattern logic unit.

FIG. 16 is a truth table showing the necessary criteria for recognizing the various characters shown in FIG. 14, by one embodiment of the present invention.

FIG. 17 shows one of the sets of the recognition criteria, in the present embodiment, necessary to enable an output AND gate for identifying a character recognized.

GENERAL DESCRIPTION

Figures 1, 18, 21:
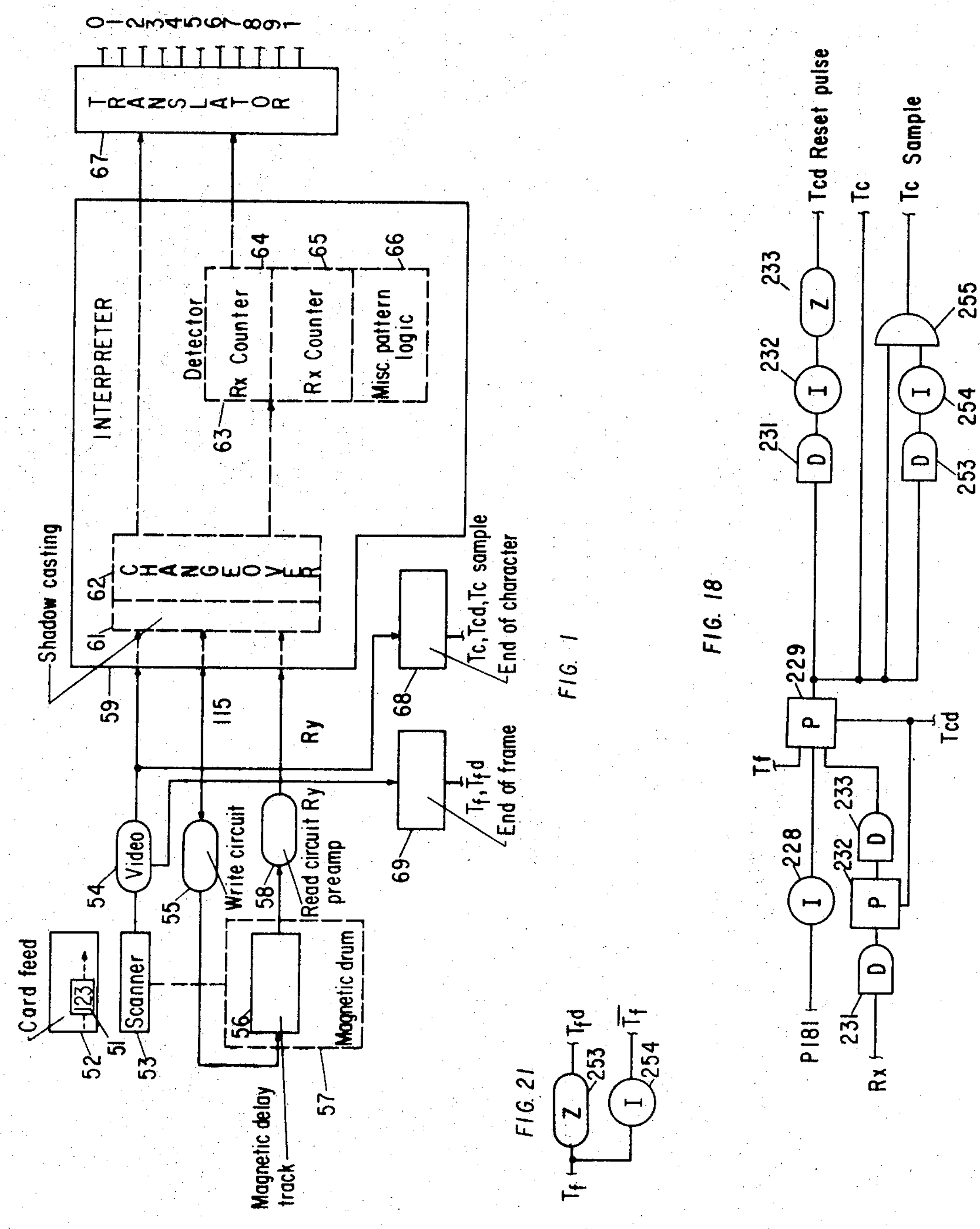
FIG. 1 is a block diagram of the present invention.
FIG. 18 is a detailed schematic diagram of the end of character subroutine unit.
FIG. 21 is a schematic diagram of the end of frame unit.

There is illustrated in FIG. 1 a functional block diagram of the present invention. This Figure is intended, along with the following description, to serve as an introduction to the detailed description which is presented hereinafter. It will be observed that the exact number of interconnections between the several units as well as the reset circuit connections are disclosed in detail in the description which follows:

Documents 51 bearing intelligence information in character form are adapted to be fed from a feed mechanism 52 which may be similar to those described in U.S. Pat. No. 3,193,281 issued July 6, 1965 to Howard W. Silsby, III et al. or U.S. Pat. No. 3,188,081 issued June 8, 1965 to Walter Lee. In the embodiment illustrated, documents are fed one at a time past the scanner 53, which for the purpose of this embodiment is disclosed as an optical scanner, where light is reflected from the surface of the moving document 51 to present at some focal point, a moving image of the information which is progressively directed into elemental zones, by a rotating mechanical slitted disc appearing as discrete successive vertical slices of the information. The images are then converted into electrical signals by a photomultiplier tube in the video circuitry 54 producing signals which are a function of the intensity of the light energy received. These signals are amplified and then set to a controlled level thus providing a two level output signal R*x* denoting the presence or absence of a character portion commonly termed "recognition" or "nonrecognition." Alternatively, if the information on document 51 was printed in magnetic ink, the characteristic electric signals would be signals produced from one or from a plurality of magnetic sensing heads moved relatively to the document.

Figure 2:
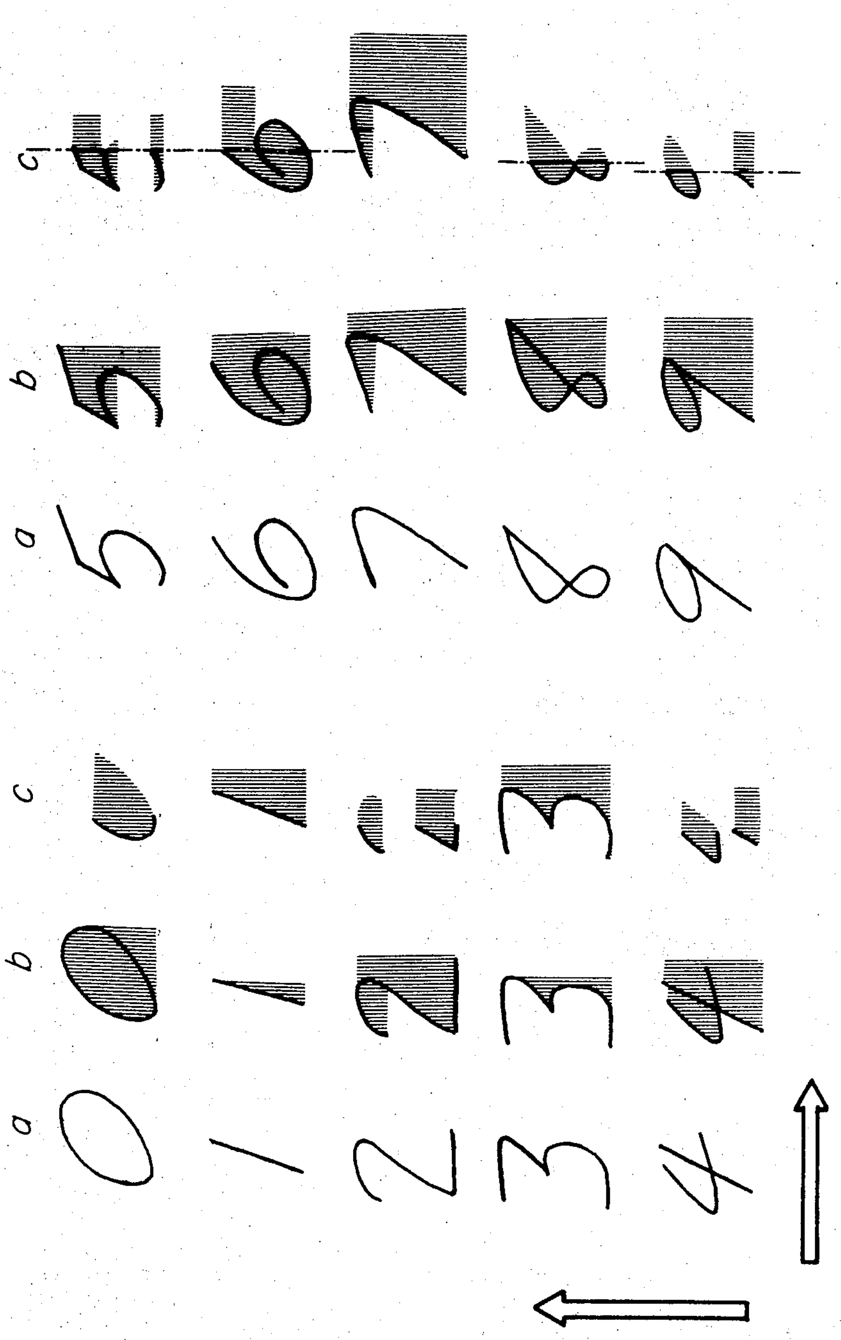
FIG. 2 is a diagram indicating one type of shapes to be detected for recognition of the different numerical characters.

The recognition signal R*x* is initially fed to an enabled AND gate in shadow casting unit 61, and then through conventional write circuitry 55 is written on a magnetic delay track 56 of a magnetic drum 57. This signal is then read back from the magnetic delay track via a read head and read circuitry 58 slightly less than one frame later and is labeled R*y*. The signal R*y* is then sent to the interpreter 59 wherein it is also fed to the writing AND gate. Therefore, the signal written on magnetic drum 57 will be R*x*+R*y*, the effect of which is to produce a signal during the present scanning frame which comprises the history of events scanned during certain previous frames. This technique electrically transforms the sensed leading edge portions of a character into an essentially horizontal projection during successive scanning frames thus creating a fill-in or shadowlike effect. The advantages of such an effect, which we shall call mode one, are many in that significant features are created independent of character size, orientation and intracharacter proportion which may be readily employed for character identification and to a large extent factors which play havoc with character identification equipment, such as small loops, in addition to variations in character slant and style, are greatly diminished. This effect may be better understood by referring to FIG. 2 wherein some of the principles used are disclosed in graphic form by first presenting in column 2*a* 10 handwritten digits from zero to nine, and in column 2*b* disclosing the fill-in which occurs if mode one is allowed to operate across the whole character. It is to be noted, however, that FIG. 2 may slightly differ from what is actually being accomplished by the present embodiment of the invention. The fill-in shown is the result of a straight horizontal projection, but other projections can be obtained by variations in the timing of the beginning and ending of the pulses recovered from the magnetic drum 57. For example, it is possible to change the projection so that the fill-in will diverge or converge and appear slightly early or slightly late so as to shift the axis of projection.

The above may be thought of as a first mode of operation as heretofore noted, whereas an improvement or additional aspect of the present invention lies in a second mode of operation comprising a conditional shift from the first to a second mode depending on what events occur during the first mode operation. The purpose for this shifting in modes of operation may be readily evident from a cursory review of FIG. 2*b* wherein it is shown that not only does the first mode of operation achieve a desired result by obscuring certain superfluous strokes, but it also produces an undesired result by additionally obscuring the characteristics of the right side of the character being scanned. For this reason the second mode of operation is utilized to prevent obliteration of the right side by way of the unique R*y* video signal.

In the second mode of operation R*x* and R*y* are fed to the magnetic delay track 56 through an AND gate in the changeover logic 62 so that R*y*—R*x* is written on the drum. The effect of the second mode, as disclosed in FIG. 2*c*, is to confine fill-in which lies within loops so that the fill-in does not extend outside the loop, as shown in the case of numerals 6 and 8 where the fill-in of the first mode operation may be continuous, but second mode operation separates the fill-in into a number of parts. One significant bit of information which can be obtained from mode two operation is the determination of whether or not the portions of a character are open or closed on the right.

FIG. 2*c* shows the signal resulting from using mode one operation on the first side of the character with a shift to mode two operation, which shift in the instant embodiment occurs after detection of certain amount of fill-in immediately adjacent to and bounded between two strokes of the R*x* signal on several successive frames. It is observed that the specific condition required in FIG. 2*c* to shift the mode of operation has not been met by digits 1, 3 and 7 and therefore a shift did not occur in these digits. Of course, it is to be emphasized that the latter condition is only one of many possible conditions which might be used to control the shift in mode operation and that any one or combination of various conditions for transfer from mode one to mode two may be utilized depending upon the program desired and the various configurations of items of information to be scanned and identified.

The shadow casting logic 61 and changeover logic 62 perform additional functions by producing a limited number of pattern criteria for character recognition. However, the majority of the pattern criteria developed for character recognition are produced by detector 63 within the interpreter, which detector is fed by the shadow casting logic 61 and changeover logic 62. The detector 63 comprises three major units designated as the R*x* counter 64, R*y* counter 65 and miscellaneous pattern logic 66, each of the units being designed to develop certain pattern criteria which in addition to the pattern criteria developed by shadow casting logic 61 and changeover logic 62, are coupled to a series of output AND gates in the translator unit 67 to emit a signal representative of the recognized scanned character. From the video unit 54 signals are fed to an end-of-character unit 68 determining the end of the character being scanned for developing reset and sampling signals, T*c*, T*cd*, and T*c* sample. Signals are also coupled from video unit 54 to a T*f* unit 69 to determine the end of each scanning frame to develop reset and sampling signals T*f* and T*fd*.

PROGRAM SYMBOLS

A brief description and corresponding symbolic representation of most of the intelligence signals to be discussed hereinafter is disclosed below for ready reference. It is noted that the signals are named for their positive occurrence and the inverse of a signal is indicated by overlining.

D*n* Delay; subscript designates unit number.

*d* Used as a prefix to indicate a differentiated signal.

*d*N*x* Differentiated pulse at the end of signal input to crossing counter *x*.

dNy Differentiated pulse at the end of signal input to crossing counter y.
dRx Differentiated pulse at the beginning of signal input to crossing counter x.
dRy Differentiated pulse at the beginning of input to crossing counter y.
F Used as a subscript to indicate signal which will occur when condition is detected in a frame, rather than when condition is detected in a number of successive frames.
In Inverter–subscript indicates unit number.
Pn Primer–subscript indicates unit number.
Rx Recognition from reading station and input to crossing counter x.
Ry Recognition from delay track on drum and input signal to crossing counter y.
∫ Integral sign. Designates step counting delay.
Tc Time, end of character.
Tcd End of character reset pulse.
Tc sample Pulse to sample the output AND gate.
Tf Time, end of frame.
Tfd End of frame reset pulse.
X2 Two crossings several times, counter X.
X3 Three crossings several times, counter X.
X1'F End first crossing in frame, counter X.
X2F Beginning second crossing in frame, counter X.
X2'F End second crossing in formed, counter X.
X3F Beginning third crossing in frame, counter X.
Y2 Two crossings several times, counter Y.
Y3 Three crossings several times, counter Y.
Y1'F End first crossing in frame, counter Y.
Y2 F Beginning second crossing in frame, counter Y.
Y2'F End second crossing in frame, counter Y.
Y3F BEginning third crossing in frame, counter Y.
Y2 B Condition which blanks Y counter from counting.
Zn Reset, subscript designates unit number.

SCANNING APPARATUS

Figure 3:
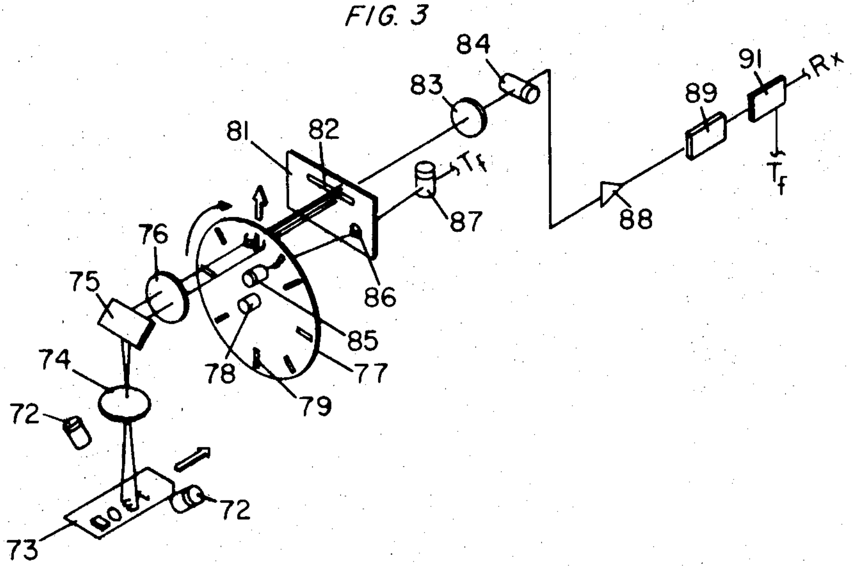
FIG. 3 is a schematic illustration of one form of an optical arrangement which may be used in the present invention.

An exemplary scanning assembly, which is one of several forms that could be used with the apparatus herein, is shown in FIG. 3 and corresponds fundamentally to that disclosed in U.S. Pat. No. 2,978,590 granted to D. H. Shepard on Apr. 4, 1961. This scanning assembly generally indicated by the reference character 53 in FIG. 1, is mounted directly over feed track of a suitable automatic document feed mechanism so that the optical center axis of scanning unit 53 is perpendicular to the plane of the feed track with the optical center axis lying in the center of the scan zone from which information is to be read. The reading area is brightly illuminated by a pair of lamps 72.

Light reflected from the document 51, is focused by a focusing lens 74 and is bent through an angle of 90° by a first surface mirror 75, and thence through a correcting lens 76 to focus the image of the document on the plane of the scanning disc 77. The scanning disc is provided with a central shaft 78 rigidly affixed thereto which shaft is supported for rotation and driven at a high velocity speed by a suitable synchronous motor interconnected thereto in any conventional manner. The scanning disc 77 is provided with a number of equally spaced radial slits 79 disposed near the periphery of the disc, and in a preferred embodiment are spaced at equal intervals of approximately 18°. The portion of the image which passes through radial slits 79 falls upon a fixed plate 81 having a slit 82 therein which is slightly shorter in length than the spacing between successive radial slits 79. The beam transmitted by fixed slit 82 is directed by a lens 83 to the photocathode of a photomultiplier tube 84 to form an electrical video signal designated as Rx, which signal is indicative of the image being scanned.

In operation of scanning unit 53, light from illuminating lamp 72 is reflected from the surface of document 51 while passing the reading station. As the image of the document is focused on the plane of scanning disc 77 in the path of radial slits 79, passage of a radial slit 79 through the image allows a thin slice of the image to fall upon fixed plate 81. This thin slice travels across an elemental zone of the image, allowing a changing portion of the image to fall upon the fixed plate 81 as the disc 77 rotates. The portion of the radial image which intersects the slit 82 is directed onto photomultiplier 84. In the preferred embodiment approximately 25—30 scans may occur as one character passes the reading station.

Since the length of fixed slit 82 is slightly less than the distance between successive radial slits, there is an interval after the completion of one scan and prior to the beginning of the next scan when no light passes through scanning disc 77. This interval is called the "dark time" and the pulse which it causes is called the "black pulse."

Provision is also made in a scanning unit 53 for providing timing signals, designated If, which identify the end of each scanning frame. For this purpose a suitable exciter lamp 85, having a directed beam of light, is mounted in front of disc 77 at a position just prior to the intersection of an image by one of rotating radial slits 79. The directed beam of light is in registry with the path of radial slits 79 to allow a narrow radial beam of light to pass through a radial slit and thence through a hole 86 in fixed plate 81 to a photocell 87 mounted in alignment with lamp 85 to thereby generate a timing signal Tf each time one of the radial disc slits 79 passes fixed hole 86.

The output lead of photocell 84 is coupled to amplifier 88 thence to quantizer 89 such as that shown in U.S. Pat. No. 2,934,208 granted June 28, 1960 to D. H. Shepard et al., for producing an output signal only when the voltage level of the pulse coupled thereto from amplifier 88 is above a critical threshold voltage which is arbitrarily set to correspond to a desired darkness or contrast level anticipated in the reading problem. The quantizer, therefore, produces a constant voltage signal (recognition pulse) when a valid "hit" or inked area is detected by photocell 84. The output of quantizer 89 is coupled to gate circuitry 91 to selectively cut out at time Tf the large positive "black pulse" occurring during the period between the moving radial slits, the output from gate 91 being the recognition signal Rx.

DELAY LINE

Figure 4:
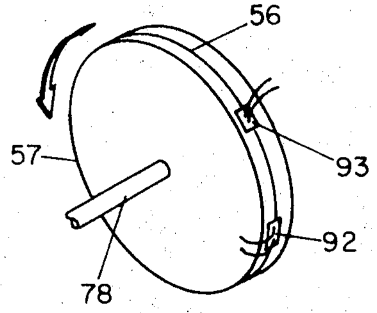
FIG. 4 illustrates one form of delay apparatus which may be employed in the present invention.
Figure 20:
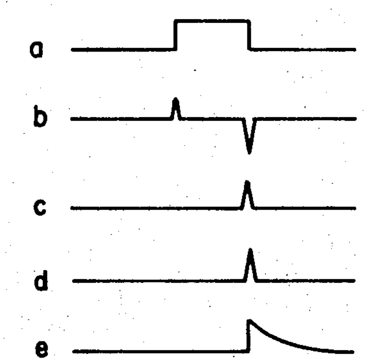
FIG. 20 illustrates a series of time related voltage waveforms showing time variant voltages at the corresponding points indicated in the special reset unit of FIG. 19.

The delay line in the present embodiment is in the form of a magnetic drum 57 having a magnetic delay track 56 as is s shown in FIG. 4, wherein the drum is rotated in synchronism with disc 77 of scanning unit 53, considering that each is mounted for rotation on the common shaft 78.

The track 56 is provided with two heads comprising a write-erase head 92 and a read head 93, the heads being spaced slightly less than 18° about the periphery thereof, where 18° is determinative of a frame period since it is the separation distance between successive radial slits 79 or disc 78. Thus the delayed signal on drum 57 coordinated with the frame period.

SHADOW CASTING LOGIC

Figure 5:
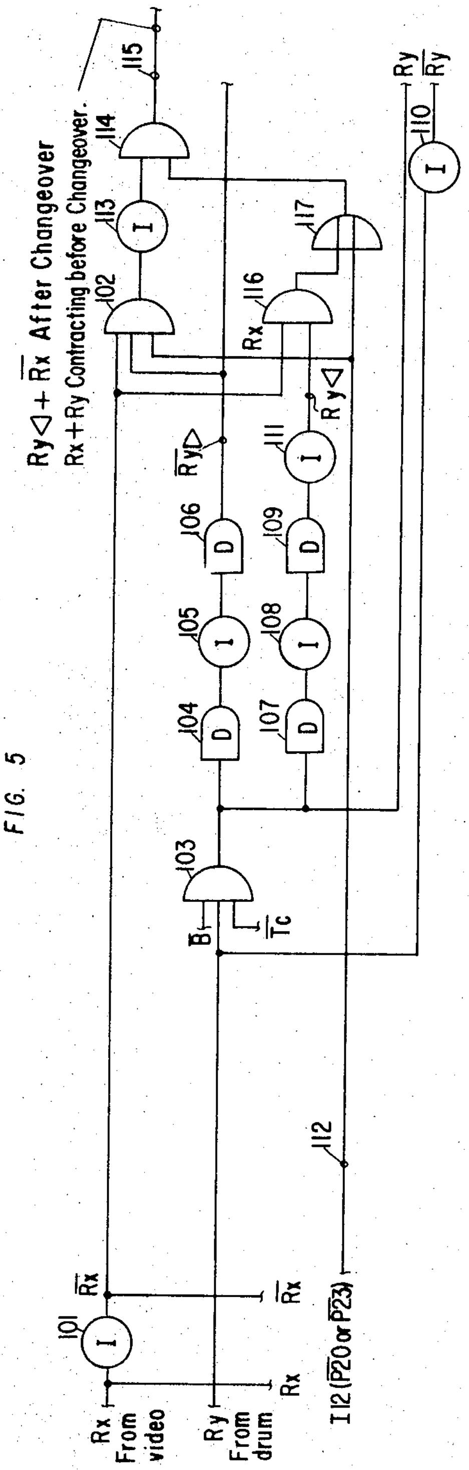
FIG. 5 represents a detailed schematic block diagram of the shadow casting unit of the present invention.

FIG. 5 illustrates schematically the shadow casting unit 61 of the present invention wherein the recognition signal Rx, derived from a scan of a character, emerges from the gate 91, shown in FIG. 3, and is applied to a conventional inverter unit 101 thence to one input of AND gate 102. The Ry signal from the magnetic drum is fed to one input of AND gate 103, which also has $\overline{B}$ and $\overline{Tc}$ as inputs, the latter signal $\overline{Tc}$ being the inverted signal of an end-of-character pulse, while $\overline{B}$ represents a conventional inverted blanking signal which is used in the video chassis to accomplish blanking. Signals $\overline{B}$ and $\overline{Tc}$, in combination, thus prevent the drum signal Ry from getting through AND gate 102 during blanking $\overline{B}$ between scans and during the end-of-character pulse $\overline{Tc}$, thus ensuring that no information is carried over from a previous character.

Figure 8:
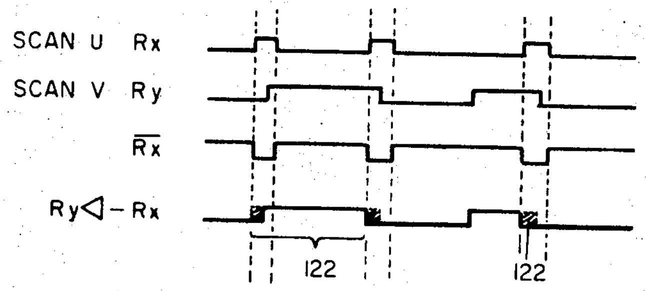

The output of AND gate 103 is employed to develop two signals labeled Ry contracting (▷) and Ry expanding (◁), where the development of each of the two signals may be best explained with additional reference to FIGS. 6, 7 and 8. In FIG. 6 the character two is moving to the left and is scanned from bottom to top as indicated by the arrows on scan *g* and *v*, which scans occur at different points in time.

When an R*y* signal from the drum is present and is passed through AND gate 103, it will be fed to a delay unit (D) 104 which delays only the positive leading edge of R*y* signal pulses to in effect shorten the pulse duration. The signal is then inverted by the inverter (I) 105 and the trailing edge of R*y* is then delayed by D 106. An exemplary embodiment of delay unit 104 is shown in FIG. 22, wherein the delay signal R*y* is applied to input terminal 301, which is tied to the control grid of pentode 302 via diode 303. T*f* sample, the grid also being coupled to +100 v. by way of a variable resistor 304 and further coupled to ground through capacitor 305. The plate of tube 302 is connected to a positive potential at terminal 306 via resistor 307, and also tapped at point 308 to be coupled to an inverter 309, the output of which is connected to terminal 311. In operation the delay unit is utilized to eliminate an initial portion of the input pulse by an adjustable fixed delay amount, so that if the input pulse is larger than the delay interval no output will occur; however, if the input pulse is larger than the delay interval, the leading edge of the output will occur one delay interval after the leading edge of the input pulse. The latter operation occurs by controlling the RC time circuit to vary the period $T_1$, see waveform at FIG. 23*a*, required for raising the potential of capacitor 305 at the grid to the voltage necessary for the conduction of tube 302. As the capacitor charges up beyond time $T_1$, the tube will conduct thus bringing down the voltage of point 308 at the plate (see waveform at FIG. 23*b*). The signal at point 308 is then inverted to present an output signal at terminal 311 (see waveform at FIG. 23*c*) which is the difference between the time duration of the input signal and the period time $T_1$.

A R*y* signal is also connected from the output of the drum read head to I 110 to provide a signal $\overline{Ry}$ for character recognition purposes. The adjustment of delay units 104 and 106 are such that the overall delay value on the leading edge of R*y* including the delay introduced by the magnetic drum, is just under one frame period, while the overall delay value on the trailing edge of R*y* is just over one frame period. The effect of the latter is to produce a signal which, in the absence of additional new signals written on the drum from R*x*, will tend to converge or contract. Therefore the output of D 106 is $\overline{Ry}$ contracting or $\overline{Ry}\triangleright$, which waveshape, during the scan *g* in FIG. 6, is shown in FIG. 7.

The output R*y* of AND gate 103 is also fed to D 107 which delays the leading edge of R*y*, the signal is then inverted by I 108 and fed to D 109 which delays the trailing edge of R*y*, and feeds the resultant signal to I 111. The settings of delay units 107 and 109 are such that the leading edge of R*y* is delayed by just over one frame period, and the trailing edge of R*y* is delayed by just under one frame period, the effect of which is to create a signal that will tend to expand or diverge. Therefore the output of I 111 is R*y* expanding or $Ry\triangleleft$, which waveshape, during the scan *v* in FIG. 6, is denoted in FIG. 8 as scan *v*.

The output $\overline{Ry}\triangleright$ of D 106, the output $\overline{Rx}$ of I 101 and a changeover signal on lead 112 are all connected to the input of AND gate 102 which, when enabled, will feed a signal to I 113 and then through AND gate 114, when enabled, to wire 115 connected to the drum write head 92. The output $\overline{Rx}$ from inverter 101 and $Ry\triangleleft$ from I 111 are coupled to AND gate 116 and thence to OR gate 117 which is also supplied with a changeover signal on lead 112, the output of OR gate 117 being connected to AND gate 114. It will appear from the following operation that the key to the changeover of operation from mode one to mode two is the value of the changeover signal applied to lead 112 from changeover unit 62 shown in FIG. 1. When changeover does not occur the signal on lead 112 will be of a relatively positive value, and when changeover does occur the signal on lead 112 will be of a relatively negative value.

In operation, assuming the first scan signal intercepting a character will occur during a scan *f* as shown in FIG. 6, and having a waveform shown in FIG. 7, then during scan *g* the delayed signal R*y* will be acted upon by D 106, I 105 and D 104 to converge and form signal $\overline{Ry}\triangleright$ shown in FIG. 7. This signal $\overline{Ry}\triangleright$ will be added to the negative signal occurring during a present scan period which in this case will be $\overline{Rx}$ from I 101. When changeover has not occurred the signal on lead line 112 will be at a relatively positive value, thus the output of AND gate 102 will be enabled to provide a resultant signal $\overline{Rx}+\overline{Ry}\triangleright$ (see FIG. 7) before changeover, which signal is then inverted by I 113 to become $Rx+Ry\triangleright$ fed to AND gate 114 enabled by the relatively positive signal from OR gate 117 and written on the drum via write head 92 to become a R*y* signal for a successive scanning frame. Therefore, during mode one operation, a present scan signal will be added to a contracting delayed signal from a prior frame period, the combination of which signals are written on the drum to become a delayed signal R*y* for a successive scanning frame, whereby the shaded, filled in or shadow casting portion 123 of the character in FIG. 6 is represented by the delayed signals R*y* and the character portion 124 of FIG. 6 is represented by the signal R*x*.

It is noted that when scanning the beginning of the character shown in FIG. 6 during the scan period *f*, a R*x* signal is present, and no R*y* signal from a prior period will appear. However, due to a relatively positive signal from delay 106 the the output of AND gate 102 will be $\overline{Rx}$ and therefore R*x* will be written on the drum as the delay signal for the next successive scanning frame *g*. It is additionally observed that during mode one operation, as shown in FIG. 6, a slight but gradual contraction 118 appears in the R*y* signal adjacent the upper stroke of the character. This contraction occurs as a direct result of the nonexistence and thus absence of R*x* signals when adding $Rx+Ry\triangleright$as shown in FIG. 7 waveforms. Those portions which are added to the $Ry\triangleright$ signal are denoted by crossed lines in the areas labeled 119. It is additionally observed that in FIG. 6, the fill-in or shadow casting area 123 is mode one operation also included the stroke width area of the character two.

When changeover does occur, initiating the mode two operation just prior to the beginning of a scanning frame *v* shown in FIG. 6, certain conditions to be explained hereinafter will cause the signal on lead 112 to be relatively negative thus disabling AND gate 102. The waveform occurring during scanning frame *u*, shown in FIG. 8, is delayed by the magnetic drum and through delays 107, 109 and inverters 108, 111 is acted upon to diverge (expand) forming a signal $Ry\triangleleft$ from I 111. This signal is added to the negative signal $\overline{Rx}$ occurring during a present scan period, or the signal R*x* will be subtracted from $Ry\triangleleft$ and indicated as $Ry\triangleleft$-R*x*. Since the signal on lead line 112 will be relatively negative the signal $Ry\triangleleft$ −R*x* from I 111, when AND gate 116 is enabled, will pass through OR gate 117 and appear at one input of AND gate 114. Since the output of AND gate 102 is then down, the output of I 113 will be up to enable AND gate 114 and pass through the signal $Ry\triangleleft$-R*x* to the drum write head via lead line 115, and become a delayed signal R*y* for a successive scanning frame in the mode two operation. It is noted that during the mode two operation, as shown in FIG. 6, a slight but gradual expansion 121 appears in the R*y* signal in the upper and lower portions of the character. This expansion occurs as a direct result of the nonexistence and thus the absence of R*x* signals shown in FIG. 8 when $Ry\triangleleft$ is subtracted from R*x*. Those portions in FIG. 8 which are subtracted from the $Ry\triangleleft$ signal are denoted by crossed lines in the areas labeled 122. It is additionally observed that the fill-in or shadow casting area 123 in mode two operation does not include the stroke width area of the character two.

The converging and diverging aspects of the shadow casting logic 61, are shown to be an integral part of the present invention, however, the invention may be used independently of these features. An advantageous purpose for utilizing the converging feature in mode one operation is mainly to provide a type of logic which would virtually ignore extraneous subject matter such as, for example, the black dot 125 within the boundary of the character illustrated in FIG. 6. This extraneous subject matter, as can be seen, will be quickly reduced to zero value thus preventing any serious affect relative to the identification of the character. In a similar manner the diverging feature in mode two operation is mainly to provide logic which would virtually ignore interference in the character in the form of partial gaps or voids, shown as 126 in FIG. 6, by filling in the R*y* signal in these open areas maintaining a continuous flow of information which is not broken or segregated into two or more parts.

R*x* CROSSING COUNTER

The R*x* crossing counter subroutine 64 shown in FIG. 1, is illustrated schematically in FIG. 9 wherein several characteristics of the video signal R*x*, from the character being scanned, are generated and employed not only to assist in developing preselected character features, but also in some cases to depict preselected character features. In FIG. 9, an input signal R*x* from the scanner video unit 54 (see FIG. 1) is fed to a*d*I 127 which produces a differentiated pulse *d*N*x* to appear at the output terminal box 135 at the end of each input recognition pulse. The preferred embodiment of the differentiating inverter stage 127 is illustrated in schematic form in FIG. 24, wherein the recognition pulse R is connected from the input terminal 312 to the grid of triode tube 313 via capacitor 314, the grid also being coupled to a negative potential of −365 volts at terminal 315 through resistor 316 whereas, depending upon the output function to be performed, the grid is additionally connected to either +15 volts or −25 volts at terminal 317 via resistor 318. Since it is desired at this instance to form a positive differentiated pulse at the trailing edge of waveform *a* in FIG. 25, as shown in waveform *b*, then a positive potential of +15 volts is applied. The plate of tube 313 is coupled to a +100 volts at terminal 317 via resistor 321 while the cathode is coupled to −125 volts at terminal 322 via resistor 323. Output terminal 324 is connected to −25 volts at 325 via diode 326, and also to +15 volts at 327 via diode 328 to clip the output signal to either of these voltages dependent upon the output value. In operation, +15 volts at 317 will be applied to the grid causing the tube to conduct and lowering the potential at 320 to produce −25 volt output at the output terminal until interrupted by an input pulse at which time the trailing edge of the input pulse will momentarily cause a potential drop at the grid to cause a positive pulse of short time duration at output terminal 324.

Signal R*x* is also directed to I 128 where the signal is inverted and fed to *d*I 129 to produce a differentiated pulse *d*R*x* to appear at output terminal box 135 at the beginning of each input recognition pulse. The output *d*N*x* of *d*I 127 is connected to primers 131 and 132, while the output of *d*I 129 is connected to primers 133 and 134, all of the primers 131—134 being reset by a reset pulse T*fd* which comes on slightly after T*f* within the frame period.

Figure 10:
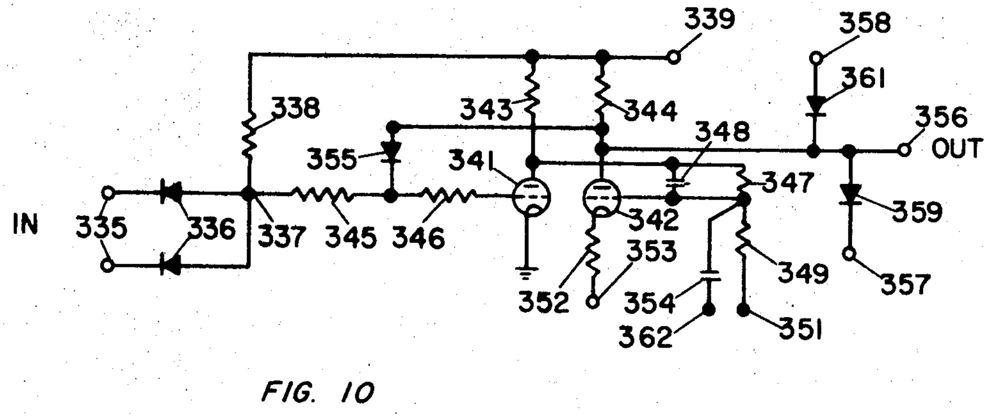
FIG. 10 shows the primer unit circuitry.

A preferred embodiment of the primer stage, such as primers 31—34, is illustrated in schematic form in FIG. 10, wherein a pair of input terminals 335 of an AND gate are connected through diodes 336 to point 337 which is coupled via resistor 338 to a positive potential of 100 volts at terminal 339. This potential at terminal 339 is further coupled to each of the plates of triode tubes 341 and 341 via resistors 343 and 344 respectively. The signal at point 337 is applied to the grid of tube 341 through resistors 345 and 346, the cathode of tube 341 being grounded and the plate of tube 341 further being coupled through resistor 347 and capacitor 348 to the grid of tube 342. The grid of tube 342 is further biased via resistor 349 to a potential of −365 volts at terminal 351. The cathode of tube 342 is biased by −125 volts through cathode resistors 352 at terminal 353, the grid of the tube 342 being additionally connected to a reset pulse at reset terminal 362 through capacitance 354. The plate of tube 342 is also joined at the intersection of resistors 345 and 346 by way of diode 355, and further tied to output terminal 356, which is clipped to −25 volts at terminal 357 and +15 volts at terminal 358, by way of diodes 359 and 361 respectively. In reset condition with no signal having been applied to either of input terminals 335, tube 341 is nonconductive and tube 342 will be conducting current since its grid is positive with respect to its cutoff potential, thereby presenting a low potential at the plate which is clipped to −25 volts at output terminal 356. However, when positive signals occur simultaneously at all input terminals 335, the potential on the grid of tube 341 will cause this tube to conduct, thereby lowering the potential on the plate of tube 341 and the grid of tube 342, and terminating conduction in tube 342, therefore raising the potential of its plate which will be clipped to +15 volts at output terminal 356. The +15 volt condition is fed back via diode 355 to maintain the grid tube 341 at a positive potential so as to sustain a positive output signal at terminal 356 until reset by a reset pulse at reset terminal 362 fed via capacitance 354 to cause tube 342 to become conductive.

P 131 will be fired by the first *d*N*x* pulse from I 127 and since *d*N*x* is an end of a recognition signal, the output of P 131 will indicate the end of the first input recognition pulse in a frame period labeled X1′ F and brought to the output terminal box 135. When P 131 comes on, the P 133 can be fired by the next pulse *d*R*x* from *d*I 129, which firing will mark the beginning of the second input recognition pulse brought to the terminal box as X2F. When P 133 has come on then P 132 can be fired by the next pulse from *d*I 127 indicating the end of the second input recognition pulse during a frame period. When P 132 has come on, P 134 will be fired by the next pulse from *d*I 129 indicating the beginning of the third input recognition pulse during a frame period. Since it has been noted that primers 131—134 are reset by the T*fd* reset pulse which occurs at the end of each frame period, P 133 will be fired only if there are at least two R*x* crossings in a given frame period and P 134 will come on only if there are at least three R*x* crossings in that frame period.

Figure 11:
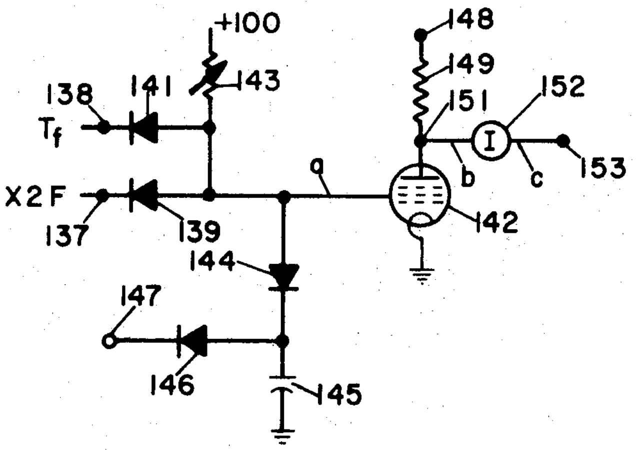
FIG. 11 shows the integrating delay unit circuit.

The output of P 133 is brought to an integrating delay (∫D) 136 and its condition is sampled by T*f*. An exemplary embodiment of an integrating delay 136 is shown in FIG. 11, wherein a recognition signal, which in this case is X2F, is applied to input terminal 137 and a sample signal T*f* is applied to input terminal 138, the input terminals being connected to the control grid of pentode 142 via diodes 139 and 141 respectively. The control grid is additionally coupled to +100 volts by way of a variable resistor 143 and further tied to ground by way of diode 144 and capacitor 145. The lead intermediate diode 144 and capacitor 145 is tied to a reset terminal 147 by way of diode 146. The plate of tube 142 is connected to a positive potential at terminal 148 via resistor 149 and is also tapped at point 151 to be coupled to an inverter 152, the output of which is connected to terminal 153.

The logical function of the integrating delay is to indicate that a given condition being tested has occurred by the time of T*f* sampling for a preselected fixed number of periodic samplings. This indication occurring at output terminal 153 as X2 (two crossings in R*x* repeated several frame periods) during the *n*th periodic sampling and will reoccur at all subsequent samplings for which the condition being tested is successfully detected, until the unit is reset at terminal 147 by signal $\overline{Tc}$. The integrating delay may be likened unto a step counter with the number of steps required to produce an indication of output, being controlled by selection of the grid capacitor and selection and adjustment of the grid potentiometer. In actual operation, the RC circuit, comprising resistor 143 and capacitance 145, is adjusted to have a time period $T_1$ for raising the potential of the capacitor 145 at the grid to the voltage necessary for conduction of tube 142, the capacitor retaining its previous charged state from previous scanning frames unless discharged by the reset pulse of a negative potential ($\overline{Tc}$) applied at reset terminal 147.

Referring back to the R$x$ counter circuitry in FIG. 9, when the output of integrating delay (∫D) 136 comes on at the end of several successive frame periods indicating at least two crossings during R$x$ (X2) have occurred, P 154 will then be fired to indicate at the output terminal box 135 that at least two crossings during R$x$ (X2) have occurred in at least a minimum number of successive frames. The signal $\overline{X2}$ is also brought to the output terminal box 135 from P 154 via I 155. In a similar manner, the output of primer 134 is brought to ∫D 156 and its condition is sampled by T$f$ so that repeated firings of P 134 will be counted by D 156 and will fire P 157, and indicate a signal X3 at output terminal box 135, if at least three crossings during R$x$ (X3) have occurred in at least a minimum number of successive frames, which need not be the same minimum number to fire P 154. The signal $\overline{X3}$ is also brought to terminal box 135 from P 157 via I 158. Both primers 154 and 157 are reset by an end of character pulse T$cd$, thus allowing their outputs X2, $\overline{X2}$, X3 and $\overline{X3}$ to be employed as inputs to the translator unit 67 (see FIG. 1) for those characters in which at least the positive or negative value of two or three crossings in the R$x$ scanning signal are identifying characteristics.

R$y$ CROSSING COUNTER

The R$y$ crossing counter subroutine 65 shown in FIG. 1, is illustrated schematically in FIG. 12 wherein several characteristics of the shadow casting or fill-in signal R$y$ from 57 are generated and utilized not only to assist in developing preselected character features to identify the character, but also in some cases to depict preselected character features. In FIG. 12, an input signal R$y$ (shadow casting or fill-in signal) delayed from the magnetic drum 57 (see FIG. 1) is fed to $d$I 161 to produce a differentiated pulse $d$N$y$ at the end of each input recognition pulse. $d$I 161 is connected to P 162 and thus the first $d$N$y$ pulse will fire P 162, the output of which will indicate the end of the first R$y$ input signal pulse in a frame period, labeled Y1′ F, in that P 162 is reset by a reset pulse T $fd$. The output of P 162 is tied to the output terminal box 163.

Signal R$y$ is also directed to I 164 where the signal is inverted and fed to $d$I 165 to produce a differentiating pulse $d$R$y$. The outputs of $d$I 165 and P 162 are tied to and fire P 166 by the first pulse $d$R$y$, marking the beginning of the second input R$y$ signal pulse Y2F, which signal is brought to the output terminal box 163. A third input pulse Y2B, to hereinafter be discussed in greater detail, on lead 167 from I 202 is also connected to P 166 to suppress further counting of the R$y$ counter only when a certain predetermined condition occurs. The output signal of P 166 and the signal pulse $d$N$y$ from $d$I 161 are coupled to and will fire P 168 at the end of the second crossing in R$y$ during a frame period designated as Y2′ F which signal is fed to P 169 in addition to the output signal R$y$ of $d$I 165 thereby firing P 169 when the beginning of the third input R$y$ pulse occurs during a frame period. Primers 162, 166, 168 and 169 are all reset by the T$fd$ reset pulse which occurs at the end of each frame period and therefore their outputs are only indicative of events occurring during a single frame period.

The output Y2F of P 166 is brought to the input of ∫D 171 which condition is sampled by T$f$, and should the output of P 166 be fired for a preselected number of successive frame periods, ∫D 171 will come on and fire P 172 the output of which indicates at the terminal box 163 that at least two crossings during R$y$ (Y2) have occurred at least a minimum number of successive frames. The signal $\overline{Y2}$ is also brought to the output terminal box 163 from P 172 by way of I 173. In a similar manner, the output of P 169 is brought to ∫D 174 which condition is sampled by T$f$ so that repeated firing of P 169 will be in effect counted by ∫D 174 where a preselected minimum number of firings or counts will fire P 175, and indicate at the output of P 175 a signal at terminal box 163, noting at least three crossings during R$y$ (Y3) have occurred in at least a minimum number of successive frames. The signal $\overline{Y3}$ is also brought to terminal box 163 from P 175 via I 176. Each of primers 172, 175 and integrating delays 171, 174 are reset by an end of character pulse T$cd$, thus allowing P 172 and 175 outputs (Y2, $\overline{Y2}$, Y3 and $\overline{Y3}$) to be employed as inputs to the translator unit 67 (see FIG. 1) for those characters in which at least the positive and/or negative value of two or three crossings in the R$y$ drum delay signal are identifying characteristics.

CHANGEOVER

The changeover routine, as previously noted, is mainly utilized for shifting the mode of operation to create additional features in the fill-in or shadowlike area, employing these additional features for more accurately distinguishing the characters to be identified. The input from the changeover unit on lead 112 in FIG. 5 is conditional upon certain events which may or may not occur in the first mode of operation, to shift the operation to mode two. What actually happens subsequent to the occurrence of certain events causing changeover denoting a shift to mode two operation, is that instead of writing the signal R$x$+R$y$ on the drum, as takes place in mode one operation, the signal R$y$—R$x$ is written on the drum. It is additionally noted that some of the signals developed in the changeover unit are also used in recognition of some characters to be identified.

Figure 13:
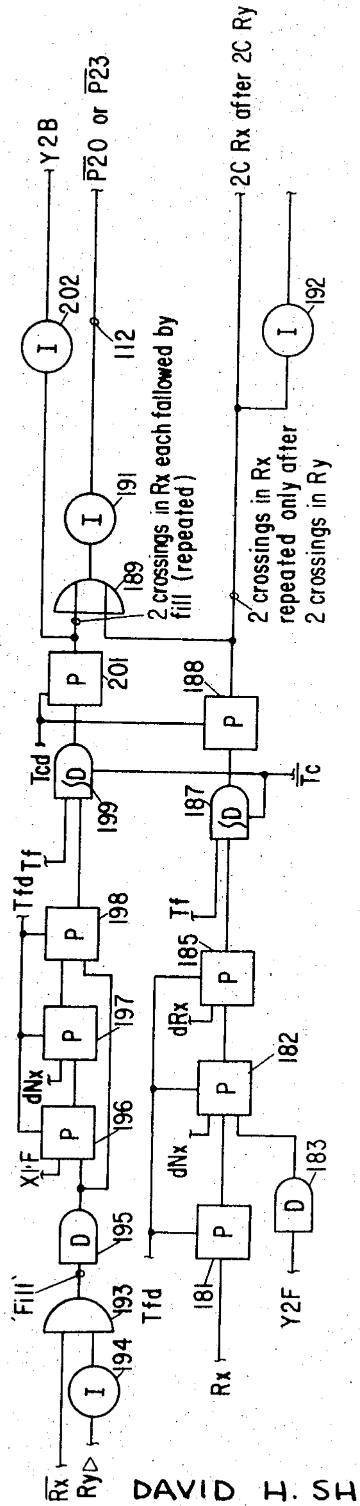
FIG. 13 is a schematic diagram of the changeover unit.

The changeover unit is shown in detail in FIG. 13, which in the present embodiment discloses two chains of logic involved in controlling or determining the occurrence of changeover, either one of the which chains of logic may produce a signal to cause changeover. In one chain of logic, R$x$ is coupled to P 181 which is fired as soon as recognition has been detected in R$x$, the output of P 181 being fed to P 182. A second input to P 182 is $d$N$x$, the end of recognition of each pulse from the R$x$ crossing counter output terminal box 135 in FIG. 9, and a third input to P 182 is D 183, being Y2F delayed, (coupled from the R$y$ crossing counter illustrated in Fig. 12), denoting the beginning of a second crossing in R$y$ during P 182 frame period. Thus, P182 will be fired in a scanning frame $u$ shown in FIG. 14 when two crossings R$y$ have occurred and when the end of a recognition pulse $d$N$x$ occurs, such as at point 184 during scanning frame $u$ of the character five in FIG. 14.

The output of P 182 and $d$R$x$, from the R$x$ crossing counter in FIG. 9, are each coupled to the input of P 185 and will fire P 185 after P 182 has bee fired and when $d$R$x$ denoting the beginning of a second crossing in R$x$ after Y2F has occurred (see point 186 at the character five in FIG. 14), therefore denoting at the output of P 185 that at least two crossings have occurred in R$x$ after two crossings have occurred in R$y$ in a single frame period. The output of P 185 is sampled at T$f$ time and step counted by ∫D 187, whereby if the same condition at the output of P 185 occurs on several successive scans, ∫D 187 will come on and fire P 188, denoting that at least two crossings have occurred in R$x$, after two crossings have occurred in R$y$ for at least several successive scanning frame periods. The output of P 188 is coupled through OR gate 189 to I 191 on to lead wire 112 to cause changeover. It is also noted that the positive and negative condition of P 188 denotes a distinct character feature, so it is also used in the identification of characters. Thus the output of P 188 is also connected to I 192 for producing an output indicative of its negative value. Primers 181, 182 and 185 are reset by T$fd$ allowing P 185 to be sampled at I$f$ time.

The purpose of the delay D 183 is to prevent overlap between Y2F and $d$N$x$. To better explain the above, it may be seen that D 183 will only come up after two crossings have begun in R$y$, so D 183 is to delay Y2F past the previous $d$N$x$ pulse which might have occurred during the first R$y$ crossing so that P 182 will not be fired until the next $d$N$x$ pulse. In effect we are forcing the recognition to be looked at for only some period after the short delayed time after Y2F.

Figure 14:
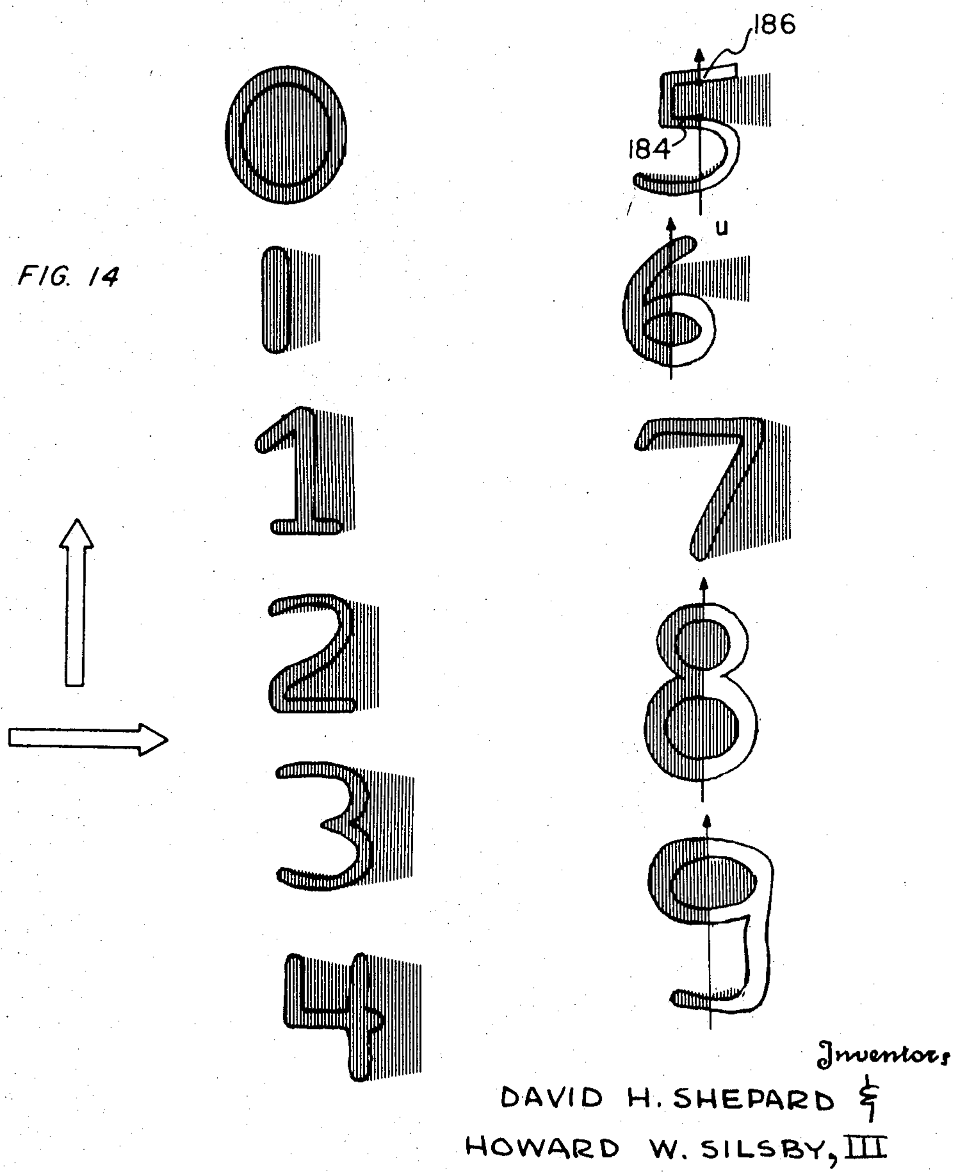
FIG. 14 is a diagram indicating typical shapes to be detected for recognition of the different numerical characters by one embodiment of the present invention.

In the second chain of logic in the changeover circuitry, $\overline{Rx}$ from I 101 in FIG. 5 of the shadow casting logic, is coupled to one input of an AND gate 193, and $\overline{Ry}$▷, the output of D 106 in FIG. 5, via I 194, is also coupled to and will enable AND gate 193 when a signal Ry▷ is present while a signal Rx is not present (Ry▷-Rx), representing only the 'fill' portion of the character or those shaded areas of the characters shown in FIG. 14 which do not include the shaded area within the stroke width of the characters since the stroke width portion recorded in Rx is subtracted out from the delay portion (Ry▷), in Ry signal introduced from a previous frame. For example, only the portion within the inner loops of the character eight in FIG. 14 is designated as the 'fill.'

D 195 has been set to come on every time that at least a short 'fill' occurs which will cause P 196 to fire if the second input to P 196, X1'F from the output terminal 135 of the Rx crossing counter in FIG. 9, has been detected, thereby indicating at the output of P 196 that a crossing in Rx has been followed by at least a short 'fill.' The output of P 196 is connected to P 197 and after P 196 fires at *d*Nx, the end of the next crossing in Rx, P 197 will be fired, indicating at the output of P 197 and the input of P 198 that a first crossing in Rx has been followed by at least a short 'fill,' which in turn has been followed by a second crossing in Rx. If this second crossing is also followed by a short 'fill' D 195 will come on again to fire P 198 to denote at the output of P 198 two crossings in Rx each followed by a short 'fill' in a single frame, since primers 196, 197 and 198 are each reset by T*fd*. At the end of each scanning frame the output of P 198 is sampled at T*f* time and step counted by ∫D 199, whereas if the same condition at the output of P 198 occurs for several successive scans, ∫D 199 will come on and fire P 201 denoting two crossings in Rx each followed by a short 'fill' repeated, which output is coupled through OR gate 189 to I 191 on to lead wire 112 causing changeover to occur. It is significant that the negative condition of P 201 is obtained via I 202 to suppress further counting of the Y counter (except for an indication of Y1'F), as if the Y counter were allowed to continue counting after changeover, P 188 and several other circuits dependent on the outputs of the Y counter would give false indications caused by the conditions after changeover. P 201, which additionally is employed to denote a distinct character feature, is reset by T*cd* for recognition of subsequent characters to be scanned.

In operation, the presence or absence of signal on lead wire 112, will directly effect the selection of the following two signals:

a. Rx plus Ry▷ and b. Ry◁ minus Rx so that only one of these signals, at any one time, will be fed to AND gate 114, the output being fed directly to the write head for recording on the delay track 56 of drum 57. Prior to the occurrence of changeover, the output of I 191 or the potential on lead wire 112 and thus at OR gate 117 will always be at plus 15 volts (signal value) which will appear not only at one input of AND gate 114, but also at one input of AND gate 102. Therefore, when the scanning inputs $\overline{Rx}$ and $\overline{Ry}$▷to AND gate 102 are positive, they will enable an output which when inverted by I 113 will present a signal at the input and output of AND gate 114, Rx+Ry▷, which is the first mode of operation of the present embodiment.

When certain events may or may not occur to fire primer 188 or 201, the output potential on lead wire 112 will be changed to a relatively negative value to cause changeover, thereby shifting the operation into mode two in the following manner. The relatively negative value on lead wire 112 will disable AND gate 102 subsequent to changeover, preventing the signal Rx+Ry▷from being recorded on drum 57. Simultaneously, the output of AND gate 116, Ry◁-Rx, will appear via OR gate 117 at AND gate 114. Since AND gate 102 is disabled subsequent to changeover the output value of I 113 will be at a plus 15 volts (signal value), to enable AND gate 114 allowing the Ry◁-Rx signal to be recorded on the magnetic drum. The significance of the changeover routine may be readily apparent from observing in FIG. 14 the fill-in of the characters intersected by a scan line, whereas the delayed signal, read from the magnetic drum and to be analyzed by recognition circuitry during each frame period, will radically change in character since prior to changeover the delayed Rx signal represents or is viewed as Rx+Ry▷, while subsequent to changeover the delayed signal Rx represents or is viewed as Ry◁-Rx. Again it is to be noted that the diverging or converging aspect of the present invention is a separate improvement to the main invention and is not critical to the operation of the invention, except as to achieve those additional results to be gained by utilization of the improvement.

MISCELLANEOUS PATTERN LOGIC

In FIG. 15, there is schematically illustrated the miscellaneous pattern logic unit denoted as unit 66 in FIG. 1. The logic in this unit is employed to recognize miscellaneous features or patterns comprising preselected combination of intelligence in the Rx present signal and the Ry delayed signal.

The first features to be established as criteria for recognition are a short vertical 'fill' during scan and also Ry occurring prior to Rx during repeated frame periods. To accomplish the latter the output of D 195 from the changeover unit in FIG. 13, representing a short vertical 'fill' portion, is fed to the input of D 203 which further delays or shortens the short vertical 'fill' applied to it and will produce an output pulse from D 203 provided that the pulse fed to D 203 is longer than the delay interval. The output of D 203 is connected to P 204 and when P 204 is fired it will denote that a short vertical 'fill' has been deleted during scanning of the character. P 204, disclosing a distinct character feature, is reset by T*cd* for recognition of subsequent characters to be scanned. The output of D 203 is also connected to P 205, reset by T*fd*, which primer is also connected to the inverted output of P 181 in the changeover unit of FIG. 13, denoting $\overline{Rx}$ in frame so that if there is no Rx in frame while there is a 'fill' portion P 205 will fire. P 205 is one of two inputs to P 206, the other being Rx, therefore if P205 has been fired and sometime later during the frame interval an Rx pulse occurs the P 206 will fire indicating that a short vertical 'fill' in Ry has occurred before an Rx pulse in frame. The output of P 206 is connected to ∫D 207 which counts the occurrences of the firings of P 206 at each T*f* time, and if the potential of ∫D 207 is satisfied after P 206 has been fired for a predetermined number of consecutive frames, then ∫D 207 will fire causing P 208 to fire denoting a distinct character feature indicating that a short vertical 'fill' in Ry has occurred before an Rx pulse for a number of consecutive frames, P 208 being reset at T*cd* time for recognition of subsequent characters to be scanned. The negative value of P 208 is obtained by connecting its output to I 209.

Another feature to be established as criteria for recognition is the occurrence of a short vertical 'fill' after the end of the first crossing Rx in a frame (X1'F) and before the second crossing in Ry. To accomplish the latter, a T*f* pulse and the output of P 196 from the changeover unit in FIG. 13, denoting a short vertical 'fill' after the first crossing in Rx, are both connected to the input of ∫D 211 and step counted so that if the condition from P 196 occurs enough consecutive times to satisfy ∫D 211, it will be fired indicating a short vertical 'fill' after X1'F for several frames. The output ∫D 211 and $\overline{Y2}$ from I 173 in the Ry counter are fed to P 212 to fire P 212, denoting a distinct character feature (reset at T*cd*), only when there is a short vertical 'fill' after X1'F and before two crossings in Ry repeated (Y2). The negative value of this signal is obtained by connecting the output of P 212 to I 213.

A further feature to be obtained in two crossings in Rx with a solid fill between, all of which is repeated in several frames. To accomplish this, the output $\overline{Ry}$▷ from D 106 of the shadow casting unit in FIG. 5, and Rx, from P 181 in the changeover unit (FIG. 13), are both fed to the input of P 214, and should $\overline{Ry}$▷follow an Rx pulse in a frame, P 214 will not be fired since in fact Ry▷is fed to P 214, but I 215, connected from the output of P 214, will be high indicating that a Rx pulse is followed by a Ry$\triangleright$condition. The inputs to P 216 are P 133, from the Rx counter in FIG. 9 (X2F), and the output of I 215, which inputs will cause P 126 to fire if both inputs are up, indicating at the output of P 216 that there have been two crossings Rx in frame with a solid fill Ry$\triangleright$between. The signal is then fed to $\int$ D 217 which counts the firings of P 216 at each Tf time and if P 216 is fired for a predetermined number of consecutive frames $\int$D 217 will fire to in turn fire P 218, denoting a distinct character feature (reset at Tcd), only when there have been two crossings in Rx with a solid fill between in repeated frames. The negative value of this signal is obtained by routing the output of P 218 to I 219.

Yet another feature established as criteria for recognition is the occurrence of two crossings but not three crossings in Ry, by the end of the character or at Tc time. To obtain the latter criteria, $\overline{Y3}$ from I 176 of the Rx counter in FIG. 12, Y2 from P 172 of the Ry counter in FIG. 12, and a sample signal denoting the end of character Tc at the output of AND gate 255 from the end of character reset subroutine in FIG. 18 to be described hereinafter, all are fed to the input of P 221, which is reset by Tcd, so that at Tc time if the Y2 and $\overline{Y3}$ signals are present P 221 will fire to denote the character feature that two crossings but not three crossings have occurred in Ry by Tc time.

Still another feature established as criteria for recognition is the occurrence of Ry not Rx at the end of a character with two crossings in Rx. This feature is obtained by connecting to the input of P 222 the signal Tf, X2 from P 154 of the Rx crossing counter in FIG. 9, Y1'F from P 162 of the Ry crossing counter in FIG. 12, and $\overline{Rx}$ the inverse output from P 181 of the changeover unit in FIG. 13, so that P 222 will fire only when there simultaneously occurs at Tf (1) no recognition in Rx, (2) the end of the first recognition in Ry, (3) two crossings have occurred in Rx at some previous time in scanning the character; occurring when the scanning of the character has ended as no Rx signal is present. The negative value of this signal is obtained by connecting the output of P 222 to I 233.

The remaining features used in the present embodiment, for establishing criteria for recognition are: P 201 and $\overline{P}$ 222; and $\overline{P}$ 201 or P222 which are arrived at as follows. The output $\overline{P}$ 201 of I 202 from the changeover unit in FIG. 13, and the output of P 222 are connected through an OR gate 224 to I 225 which output is P 201 and $\overline{P}$ 222. The inverter output of I 225 is then connected to I 226 the output of which is $\overline{P}$ 201 or P222.

TRANSLATOR

The translator unit 67 in FIG. 1 is the output unit employed to recognize the character being scanned, which in the preferred embodiment of the present invention is disclosed as handwritten or printed Arabic numerals 0 through 9 as shown in FIG. 14. The 14 intracharacter features or patterns which have been developed from the basic Rx and Ry signal combinations explained in detail heretofore, are utilized for identification of each character in the specific set of characters disclosed in FIG. 14.

A preferred set of such patterns is disclosed in the left vertical column of FIG. 16, being referred to by the primer and inverter units P 209 to I I 226, from which the pattern or feature signals emerge. These 14 intracharacter patterns and the set of Arabic numerals 0 through 9, of the type specifically appearing in FIG. 14, are together set up in a truth table as shown in FIG. 16, wherein the vertical columns of plus and minus characters below the numerals represent the criterion of presence and absence, respectively, of the associated patterns, in the left-hand column, for recognition of that particular numeral above its respective vertical column. Those portions of the truth table which are blank indicate that it makes no difference whether or not the associated patterns are detected.

Each set of necessary criteria representing a particular character is connected to an AND gate in the translator unit 67, which AND gate, when fed by all of the necessary criteria inputs will be enabled, to indicate recognition of that particular character. An example of the latter is shown in FIG. 17, when the necessary criteria to be present connected to AND gate 227 for the recognition of the numeral 6 (shown in FIG. 14) are: P 201 or two crossings in Rx each followed by a 'fill,' repeated; P 222 or Ry not Rx at the end of character, two crossings in Rx having previously occurred; and P 172 or two crossings in Ry. When all the latter criteria are present, AND gate 227 will be pulsed at Tcd sample time and enabled indicating that the character being scanned is the numeral 6. It may be readily observed with reference to FIGS. 14 and 16 that changeover will occur not only in the character 6, but also in each of the characters 5, 8 and 9.

The unique sets of criteria which are possible by employing signals of the nature Rx and Ry (shadow effect), are capable of enabling the device to read a large number of font (s) of type, since the fill-in or shadowlike effect and/or the changeover effect transforms characters allowing new significant features or patterns to be developed while others remain. Thus the present invention, by predetermined programming allows a large number of printed or handwritten fonts to easily be read.

END OF CHARACTER AND FRAME RESET LOGIC

In describing the preferred embodiment of the logic in the present invention, reference has been made in numerous instances to such signals as Tc, Tf, Tc sample, generally for resetting or enabling the various circuit components at certain time intervals during the logic routine. It is only natural that a character might be recognized upon completion of the scanning or reading operation, although it is noted that in an alternative embodiment, recognition of a certain number of selected predetermined criteria within each character may be sufficient to determine the occurrence of the end of a character for recognition purposes.

In the present invention, the former method is used for determining end of character signals, an exemplary embodiment of which is illustrated in schematic form in FIG. 18 wherein Rx in scan from P 181 in the changeover unit in FIG. 13 denotes the beginning of recognition and is fed to I 228, inverted, and teen fed as one input to P 229. Thus the I 228 output will be on at the end of a scan frame only if no recognition has been seen during the entire scan frame. The Rx input scan signal is also fed to D 231 set to come on if a small vertical stroke is seen in Rx, whereas D 231 is usually set so that a horizontal crossing is not thick enough to cause it to come on, but a slightly longer pulse, such as one from a slanted stroke, will cause D 231 to fire. When D 231 comes on, it marks the beginning of a character, and will cause P 232 to fire which stays on until reset at the end of the character at Tcd time. D 233 connected from P 232 will come on at a fixed interval after P 232 is fired, and the D 233 output marks the arbitrarily defined "right side" of the character, so that if D 233 is on at the end of a scan when Tf the third input to P229 occurs, I 228 will be high as Rx will not appear at the end of a character, and therefore P 229 will fire marking the end of a character Tc.

Figure 19:
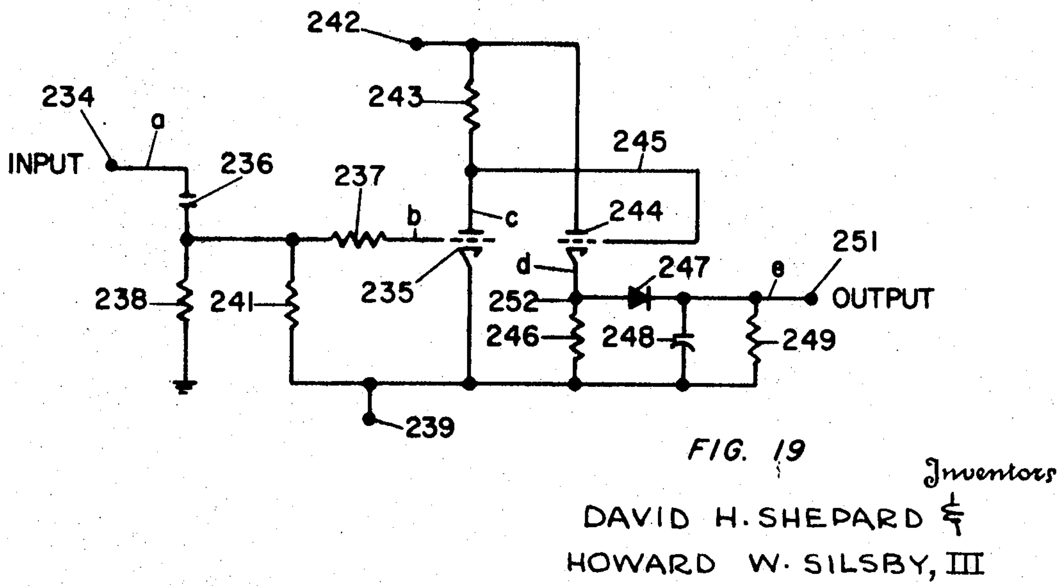
FIG. 19 is a circuit diagram of the special reset unit.

The Tc pulse from P 229 is fed to D 231 which will come on a fixed interval, then fed to I 232 which output will go down and cause its connected reset unit Z 233 to produce an output pulse Tcd. An exemplary embodiment of the reset unit Z 233 is illustrated in schematic form in FIG. 19, wherein input terminal 234 is coupled to the grid of triode tube 235 via capacitor 236 and resistance 237. Intermediate the lead connecting capacitor 236 and resistance 237 is a connection to ground via resistor 238 and also to a −125 volt supply at terminal 239 via resistor 241. The plate of triode 235 is coupled to a +100 volt supply at terminal 242 via resistor 243, while the cathode of triode 235 is tied directly to terminal 239. The plate of tube 235 is also coupled to the grid of triode 244 via lead 245. The plate of triode 244 is connected to terminal 242, and the cathode of tube 244 is tied to terminal 239 through resistor 246 in one path, through diode 247 and capacitor 248 in another path, and through diode 247 then resistor 249 in a third path, while the cathode of triode 244 is further connected to an output terminal 251 via diode 247. In operation, tube 235 will normally be conducting due to the relatively positive potential on its grid, and tube 244 will be cut off. However, when an abrupt change from a positive to a negative signal is applied to the input terminal 234 (see waveforms 20 *a* and *b*), it will cause tube 235 to be instantaneously cut off, thereby making tube 244 conductive during the instant due to the positive pulse connected from the plate of tube 235 to the grid of tube 244 through lead 245 (see waveform 20 *c*). Therefore, the grid of tube 244 for an instant becomes positive with respect to its cathode 252 (see waveform 20 *d*), charging capacitor 248, then allowing capacitor 248 to gradually discharge through resistor 249 as shown in waveform 20 *e* which signal appears at output terminal 251.

Referring back to FIG. 18, AND gate 255 will be enabled as soon as P 229 fires since the output of I 254 will be up, and AND gate 255 will remain enabled until D 253 fires to cause I 254 to go down. Thus, the duration of the T*c* sampling pulse is set by D 253 which delay is set so that it is less than the delay setting of D 231 and so its duration is less than the end of character pulse T*c*.

From FIG. 21, it may also be observed that in a similar manner signals T*fd* and T̄*f* may be arrived at by connecting the signal T*f* to each of units Z 253 and I 254.

It should be understood, of course, that the foregoing disclosure relates to only a preferred embodiment of the invention and that numerous modifications or alternations may be made therein without departing from the spirit and scope of the invention, it is desired, therefore, that only such limitations be placed on the invention as are imposed by the prior art and as set forth in the appended claims.

We claim:

1. Apparatus for reading intelligence-bearing items comprising:

means for scanning the area of an item to be read along a plurality of scanning frames and producing current scan signals during each scanning frame characteristic of the item scanned, logic means for continuously performing over all scanning frames including and prior to the current scanning frame logical operations on the whole set of scan signals for each current scanning frame with a second set of signals applied thereto to produce a composite transformed scan signal set output comprising at least one signal element having no more than a single bit per signal element, said composite transformed signal set output being the logical sum of the constituent signal elements of the whole sets of the scan signal from all of the scanning frames prior to and including each current scanning frame, storage means for delaying said composite transformed scan signal set output of the logic means during each scanning frame to form said second set of signals and applying the same during successive subsequent scanning frames to said logic means in frame coordinated relation with the whole set of current scan signals for such subsequent scanning frames whereby said composite transformed scan signal set output produced during each scanning frame comprises a set of transformed scan signals whose constituent signal elements are essentially horizontal projections of intercepted portions of the item corresponding to shadowlike horizontal projections of the item defining a configuration which is related to but distinguishable from the area of the item to be read, first detection means for detecting preselected intracharacter patterns from at least one of said composite signals, said one composite signal being sometimes utilized before that scanning frame which last intersects the item, and means for recognizing the item to be identified by employing said patterns for providing an output signal indicative of the item recognized.

2. The combination recited in claim 1 including third detection means for detecting preselected intracharacter patterns from combinations of said composite transformed scan signals and said current scan signals.

3. The combination recited in claim 2 including second detection means for detecting preselected intracharacter patterns from said current scan signals.

4. The combination recited in claim 1 wherein said means for performing logical operations comprises means for providing a first single mode of operation continuous over plural scanning frames for logically adding the current scan signals with the second set of scan signals to produce said composite transformed scan signal.

5. The combination recited in claim 1 including means for effecting changeover from the first single mode of said logic operations to a second single mode of operation continuous over plural scanning frames when certain conditional events related to the item being scanned are detected.

6. The combination recited in claim 5 wherein means responsive to the changeover means for logically subtracting said current scan signals from the second set of scan signals to produce a composite transformed scan signal in response to the occurrence of said changing.

7. The combination recited in claim 5 including means for diminishing the extent of the second set of scan signals prior to the occurrence of said changing.

8. The combination recited in claim 5 including means for lengthening the extent of the second set of scan signals subsequent to the occurrence of said changing.

9. In character recognition apparatus comprising a line scanner for generating current scan signals when scanning an item, delay means fed by a composite transformed signal comprising a current scan line signal output of the scanner and a second scan signal representing all scan line outputs prior to the current scanning line of the scanner, means defining a first single mode of operation continuous over all scanning lines including and prior to said current scanning line for logically adding each said current scan line signal and second scan signal to continuously produce said composite transformed signal before being fed to said delay means, said transformed signal comprising at least one signal element having no more than a single bit per element and being the logical sum of the signal elements of the current and second scan signals such that the ransformed composite signal comprises essentially horizontal portions of the item corresponding to shadowlike horizontal projections of the item defining a configuration which is related to but distinguishable from the area of the item to be read, interpreter means responsive to at least one said composite transformed signal and at least one current scan signal generated from the line scanner to detect preselected intracharacter patterns present within the item, said one composite signal being sometimes utilized before that scanning frame which last intersects the item being scanned, and translator means responsive to said interpreter means for recognizing the item to be identified in accordance with combinations of said patterns and providing an output signal indicative of the item recognized.

10. The combination recited in claim 9 including means effecting changeover from the first to a second single mode of operation continuous over plural scanning lines, and means responsive to said changeover means for logically subtracting the second scan signal output from the current scan signal output to form the composite transformed signal during said second single mode of operation.

11. The combination recited in claim 10 wherein said means for changeover occurs when a preselected certain conditional event related to the item being scanned is detected.

12. A method for scanning items on intelligence-bearing documents and forming an electrical representation of a horizontal projection of the item defining a shadowlike effect comprising the steps of scanning the area of the item to be read along a plurality of successive scanning frames and generating a current scan signal characteristic of the item scanned, continuously performing over all scanning frames prior to and including the current scanning frame at least one logical operation on the current scan signal with intercepted portions of the item from all scanning frames prior to the current scanning frame thereby forming a composite transformed scan signal comprising at least one signal element made up of no more than a single bit per element, said composite transformed signal being a logical function of the whole sets of scan signals from all of the scanning frames prior to and including each current scanning frame, storing the composite transformed scan signal, withdrawing the composite signal from storage during successive scanning frame intervals to represent said intercepted portions of the item from prior scanning frames, processing at least one of said composite transformed signals to detect preselected intracharacter patterns where said one composite signal is sometimes utilized before that scanning frame which last intersects the item being scanned, and utilizing the said patterns in preselected combinations for recognizing the item to be identified.

13. The method recited in claim 12 including:

inhibiting the logical operation step when certain conditional events related to the item being scanned are detected, and then changing the logical operation performed on the current scan signal and the intercepted portions of the item from prior scanning frames to form the composite transformed scan signal made up of no more than a single bit per element.

14. Character recognition apparatus comprising a line scanner for generating current scan signals when scanning an item, delay means fed by a composite transformed signal comprising a current scan line signal output of the scanner and a second scan signal representing all scan line outputs prior to the current scanning line of the scanner, means defining a mode of operation continuous over all scanning lines including and prior to the current scanning line for logically operating on each said current scan line signal and second scan signal to continuously produce said composite transformed signal comprising at least one signal element having no more than a single bit per element and being a logical function of the signal elements of the current and second scan signals such that the transformed composite signal corresponds to shadowlike projections of the item, which projections define a configuration which is related to but distinguishable from the area of the item which is projected, interpreter means responsive to at least one said composite transformed signal and at least one said composite transformed signal and at least one current scan signal generated from the line scanner to detect preselected intracharacter patterns present within the item, at least some of which correspond to said configuration, said one composite signal is sometimes utilized before that scanning frame which last intersects the item being scanned, and translator means responsive to said interpreter means for recognizing the item to be identified in accordance with combinations of said patterns and providing an output signal indicative of the item recognized.

15. The combination recited in claim 14 including means effecting changeover to a further mode of operation continuous over plural scanning lines, and means responsive to said changeover means for performing another logical operation on the second scan signal output and the current scan signal output to form the composite transformed signal during said further mode of operation.

16. Character recognition apparatus comprising 1. scanning means for successively scanning a character to be identified over a plurality of scanning frames where the current scanning frame signal comprises a set of at least one signal element, which element corresponds to the presence of a stroke in the character or extraneous matter;
2. logic means for continuously performing over all scanning frames including and prior to the current scanning frame at least one logical operation on the entire current scanning frame signal and a second signal set to provide a transformed scan signal set for each scanning frame, said transformed scan signal set being a logical function of the current scanning frame signal and all scanning frame signals prior to the current one and comprising a set of at least one signal element having no more than a single bit per element, which element corresponds to a projection of at least a portion of the said character to be identified;
3. delay means responsive to said transformed scan signal set for delaying said transformed scan signal set a predetermined period of time to produce a further second signal set which would be subjected to the said logical operation with one of the scanning frame signals following the current scanning frame signal; and
4. decision means responsive to at least one said transformed scan signal set for identifying said character, said one transformed scan signal set sometimes being utilized before that scanning frame which lasts intersects the character being scanned.

17. Character recognition apparatus as in claim 16 where the said logical operation performed by said logic means is that of addition.

18. Character recognition apparatus as in claim 16 where the said logical operation performed by said logic means is that of subtraction.

19. Character recognition apparatus as in claim 16 where the said predetermined period of time that said delay means delays said transformed scan signal set is slightly less than the period of time required for one scanning frame.

20. Character recognition apparatus as in claim 16 including means responsive to the occurrence for a predetermined number of times of at least said element of said transformed scan signal set for changing the said logical operation performed by said logic means.

21. Character recognition apparatus as in claim 20 where said logical operation is changed from addition to subtraction.

22. Character recognition apparatus as in claim 16 where said decision means is also responsive to said current scanning frame signal to identify said character.

23. Character recognition apparatus as in claim 22 where said decision means includes means responsive to predetermined combinations of said element of said transformed scan signal set and said element of said current scanning frame signal to provide identification information about said character.

24. Character recognition apparatus as in claim 23 where the projection of the character portion corresponding to said element of said transformed scan signal set and the character portion corresponding to said elements of said current scanning frame signal are vertically disposed with respect to one another within the character.